May 10, 1938. F. B. HUNT ET AL 2,117,025
METHOD OF AND APPARATUS FOR PRODUCING CARBON DIOXIDE
Filed Aug. 24, 1933 4 Sheets-Sheet 3

INVENTORS
Franklin B. Hunt, Jabez H. Pratt,
Henry S. Tirrell + Robert L. Turner,
BY
Hood + Hahn
ATTORNEYS INVENTOR.
Franklin B. Hunt, Jabez H. Pratt,
Henry S. Tirrell + Robert L. Turner,
BY
Hood & Hahn
ATTORNEYS Patented May 10, 1938

2,117,025

UNITED STATES PATENT OFFICE 2,117,025

METHOD OF AND APPARATUS FOR PRODUCING CARBON DIOXIDE

Franklin B. Hunt, Jabez H. Pratt, Henry S. Tirrell, and Robert L. Turner, Chicago, Ill., assignors to The Liquid Carbonic Corporation, Chicago, Ill., a corporation of Delaware Application August 24, 1933, Serial No. 686,486

8 Claims. (Cl. 62—121)

The present application relates to a method of and apparatus for producing carbon dioxide, and more particularly to a novel method and apparatus whereby carbon dioxide may be produced commercially in the liquid or solid form, substantially or entirely without the use of purchased power.

Until quite recently, the standard practice in substantially all commercial plants producing carbon dioxide has been to burn coke in a furnace having a boiler associated therewith, whereby gaseous products of combustion are produced. The steam so produced is used to drive an engine which, in turn, operates certain pumps and other mechanism. The gaseous products of combustion are led through scrubbing chambers where the solids and sulphur dioxide are removed, and thence to an absorption tower. The absorption tower, according to standard practice, comprises a column filled usually with coke; and an aqueous solution of sodium carbonate, or other suitable solvent, is caused to trickle downwardly through the mass of coke while the gaseous mixture is caused to flow upwardly through that mass; whereby a large part of the carbon dioxide in the mixture is absorbed in the so-called lye solution, and the residual gases are permitted to pass out of the absorbing tower.

The liquid which reaches the bottom of the absorption tower is called, in the art, strong lye; and is a solution of mixed sodium carbonate and sodium bicarbonate. That is, the carbon dioxide which has been "absorbed" from the gaseous mixture has actually entered into chemical combination with sodium carbonate to form sodium bicarbonate. That solution is led to a boiler which, according to standard practice, is heated by steam exhausted from the above-mentioned engine. As the temperature of the solution rises, the sodium bicarbonate in the solution is broken down to sodium carbonate, with a consequent release of the absorbed carbon dioxide. The resulting "weak lye" solution is led from the boiler back to the absorption tower to absorb more carbon dioxide; while the carbon dioxide driven off in the lye boiler, together with a certain amount of steam unavoidably driven off therewith, is carried to a condenser where the admixed steam is condensed and separated from the carbon dioxide. The carbon dioxide is then carried to compressors and coolers to be condensed to liquid form or frozen to solid form.

It is a matter of record that, in most plants commercially operating to produce solid carbon dioxide in accordance with the above plan, the yield of solid carbon dioxide is only from 40 to 50 percent of the amount of gaseous carbon dioxide produced in the furnace. It is also a matter of record that, in a large number of plants tested, the consumption of purchased power ran from 105 to 120 kilowatt hours per thousand pounds of solid carbon dioxide. We have found it possible to increase materially the percentage of yield, and, at the same time, to eliminate the necessity for purchased power. We have found that, in accordance with our invention, no purchased power at all is required in the manufacture of solid carbon dioxide.

To the accomplishment of the above and related objects, our invention may be embodied in the form illustrated in the accompanying drawings, attention being called to the fact, however, that the drawings are illustrative only, and that change may be made in the specific construction illustrated and described, or in the specific steps stated, so long as the scope of the appended claims is not violated.

Figure 1:
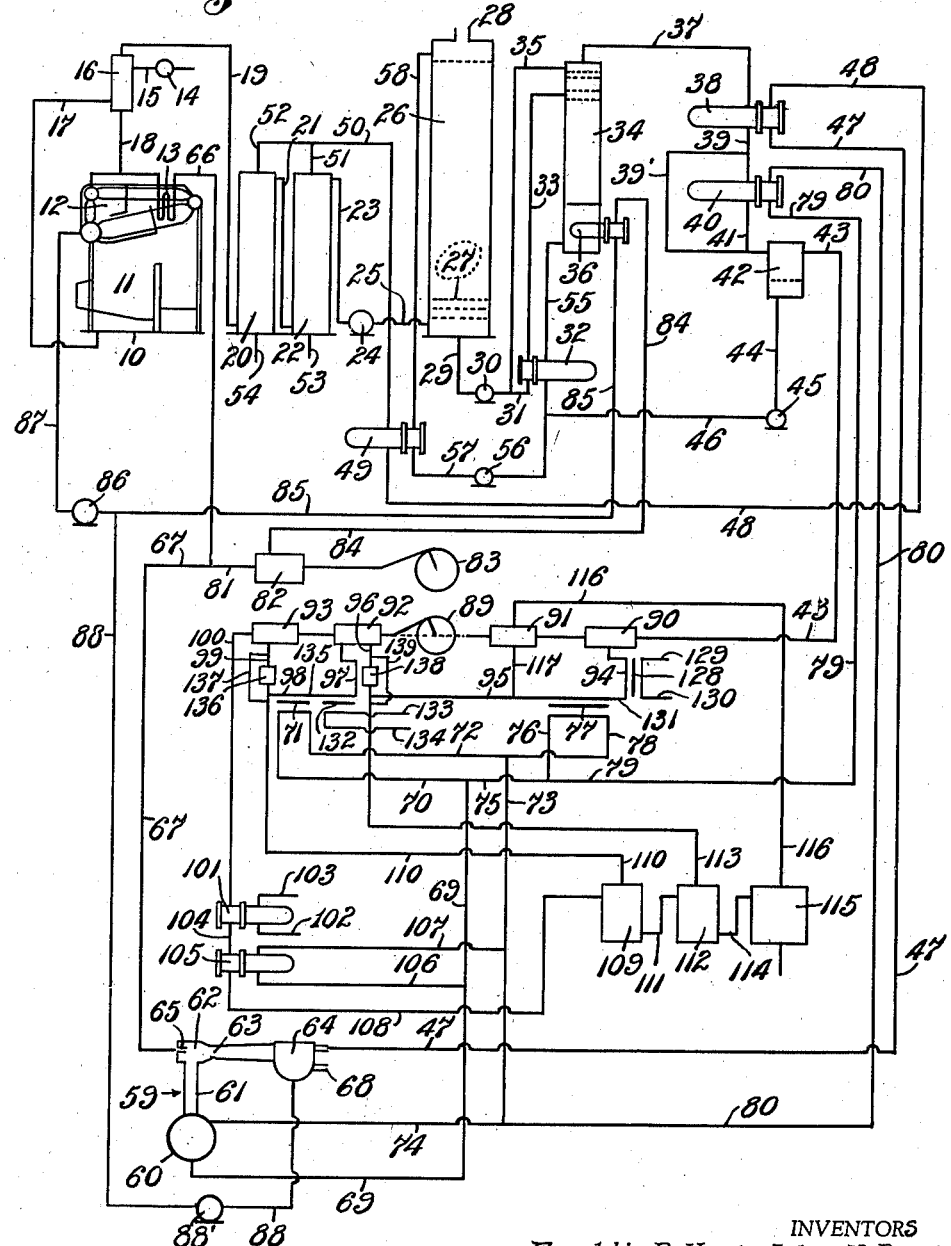
Fig. 1 is a flow sheet of a plant constructed in accordance with the present invention.

Referring more particularly to the drawings, it will be seen that we have illustrated a furnace indicated generally at 10 and comprising a fire box 11 with which is associated a boiler indicated generally at 12; said boiler including a super-heater 13. A blower 14 forces air under pressure through an inlet 15 to and through a pre-heater 16 and thence through a conduit 17 to the fire box 11. Products of combustion from the fire box 11 flow over the boiler tubes and through a flue 18 to and through the pre-heater 16 and thence through a conduit 19 to a first scrubber 20. From the scrubber 20, the gases flow through a conduit 21 to and through a second scrubber 22. In the scrubbers 20 and 22, the mixture of the products of combustion is purged of solids and water soluble gases; and the remaining gaseous mixture, materially cooled, is led from the scrubber 22 through a conduit 23 connected to the intake side of a blower 24. In the blower 24, the pressure of the mixture of gaseous products of combustion is somewhat raised, and such mixture is forced through the conduit 25 to the absorption column 26 at a positive gauge pressure sufficient to force the mixture through the liquid in the tower and to effect the desired absorption.

While we have found that we can satisfactorily use the usual absorption tower such as we have described hereinabove, we prefer to provide a bubble column of a type which is well known but which, so far as we are advised, has never been used in the absorption step in the carbon dioxide art. Such a column comprises a tall, cylindrical chamber having mounted therein a plurality of trays 27 formed with perforations, said perforations being guarded by bubble caps, and the trays and caps being so constructed and associated that each tray carries a burden of liquid, constantly overflowing to the next lower tray, whereby liquid constantly moves downwardly through the column while gas constantly bubbles upwardly through the liquid carried on the trays. In this manner, the gases and liquid are brought into much more intimate contact, whereby the separation of carbon dioxide is much improved over the above-described usual methods.

As is clearly shown in Fig. 1, the gases under pressure are introduced at the bottom of the column 26 through the pipe 25, and said gases bubble upwardly from one to another of the trays 27, being allowed to escape to the atmosphere through the outlet 28 when they have passed the uppermost tray. During the travel of the gases upwardly through the column 26, substantially all of the carbon dioxide is absorbed in the solution carried by the trays, so that the lowermost trays in the column carry a solution which is substantially all sodium bicarbonate. The strong lye solution flows from the bottom of the column 26 through the conduit 29 and the pump 30, and thence through the conduit 31 to and through a heat exchanger 32 where the solution is somewhat warmed. Thence, the solution flows upwardly through the conduit 33 to a plate column 34, entering at a point below the top of said column. As the strong lye trickles downwardly through the plate column 34, it is rapidly heated by the heating coil of the lye boiler 36, whereby carbon dioxide and steam are driven out of the solution. The capacity of the lye boiler and plate column is increased by by-passing a small quantity of the cold strong lye around the exchanger 32 through the conduit 35 to the extreme top of the plate column 34. This cold strong lye is heated in passing through the top plates of the column 34 by the condensation of a large part of the steam driven off in the boiler 36, and which would otherwise be wasted in the condensers wherein the steam is separated from the carbon dioxide.

The mixture of carbon dioxide and steam driven off in the column 34 passes through the conduit 37 to and through a heat exchanger 38, and thence through a conduit 39 to and through a second heat exchanger 40, and thence through a conduit 41 to a separator 42, wherein the condensed steam is separated from the carbon dioxide. The water separated in the trap or separator 42 flows through the conduit 44 to a pump 45 and thence through the pipe 46 to join the weak lye solution returning from the plate column 34 through the pipe 55.

Of course, the weak lye flowing through the pipe 55 is hot, and that liquid is caused to flow through the heat exchanger 32 to give up a portion of its heat to the cold strong lye flowing through the pipes 31 and 33 to the column 34.

Cooling water is supplied (in a manner later to be described) through a pipe 47 to the heat interchanger 38, said cooling water effecting the first cooling of the carbon dioxide and steam mixture flowing through the conduit 37. From the interchanger 38, that cooling water flows through a pipe 48 to a second heat exchanger 49, and thence through the pipes 50, 51, and 52 to the scrubbers 20 and 22. After the cooling water has flowed through the scrubbers 20 and 22, it may be discharged to the sewer through the pipes 53 and 54.

The hot weak lye returning from the column 34 and the condensed water returning from the separator 42 are forced by a pump 56 through the pipe 57 to the interchanger 49, being therein cooled to the absorption temperature. The solution flows from the exchanger 49 through the pipe 58 to the top of the bubble column 26.

For reasons which will be discussed hereinafter, we provide a refrigerating system in the present organization. In the illustrated embodiment that refrigerating system takes the form of a commercial vacuum refrigerating system, and is indicated generally at 59.

A tank 60 contains a liquid medium which, in most instances, will be water. A conduit 61 provides open communication between the upper surface of the water in the tank 60 and a chamber 62 which communicates through a venturi 63 with a condenser 64. One or more high velocity nozzles 65 in the chamber 62 are directed toward the venturi 63. High pressure, superheated steam is conducted through conduits 66 and 67 to the nozzles 65 and is discharged through said nozzles at a very high velocity and under a pressure sufficiently high to permit condensation in the condenser 64 with water at available temperatures. The steam flowing through the chamber 62 and venturi 63 at high velocities creates, of course, a suction in the conduit 61. The condensation in the condenser 64 aids in the production of that suction, whereby a relatively high vacuum is drawn in the tank 60. Such vacuum results, of course, in evaporation of water in the tank 60, with a resultant reduction of temperature of the water in said tank. With available water supply at a temperature of 80 to 90 degrees, it is possible, through the use of this vacuum refrigerating system, to obtain temperatures of from 40 to 45 degrees in the tank 60. Water from an available supply is caused to enter the condenser 64 through the pipe 68. After doing its required work in the condenser 68, that cooling water is led through the pipe 47 to the exchanger 38, and thence through the pipe 48, the exchanger 49, the pipes 50, 51 and 52, the scrubbers 20 and 22, and the pipes 53 and 54 to the sewer.

The refrigerated water from the tank 60 flows through the conduits 69 and 70 to a heat exchanger 71, and thence through the pipes 72 and 73 to the return pipe 74 and so back to the tank 60 for further cooling. Refrigerated water likewise flows from the tank 60 through the pipes 69, 75 and 76 to an exchanger 77 and thence through the pipes 78, 73 and 74 back to the tank 60.

Refrigerated water likewise flows through the pipes 69, 75, and 79 to the interchanger 40 and thence through the pipes 80 and 74 back to the tank 60.

Steam from the boiler 12 and superheater 13 is supplied through the pipes 66 and 81 to a main steam engine 82 including a flywheel 83. The steam exhausted from the engine 82 flows through the pipe 84 to the boiler 36, and thence through the pipe 85 to the inlet side of a pump 86 which returns the condensed steam through the pipe 87 to the boiler 12. The steam condensed in the condenser 64 is forced by the pump 88' through the pipe 88 to the inlet side of the pump 86, whence it is returned through the pipe 87 to the boiler 12.

Figure 3:
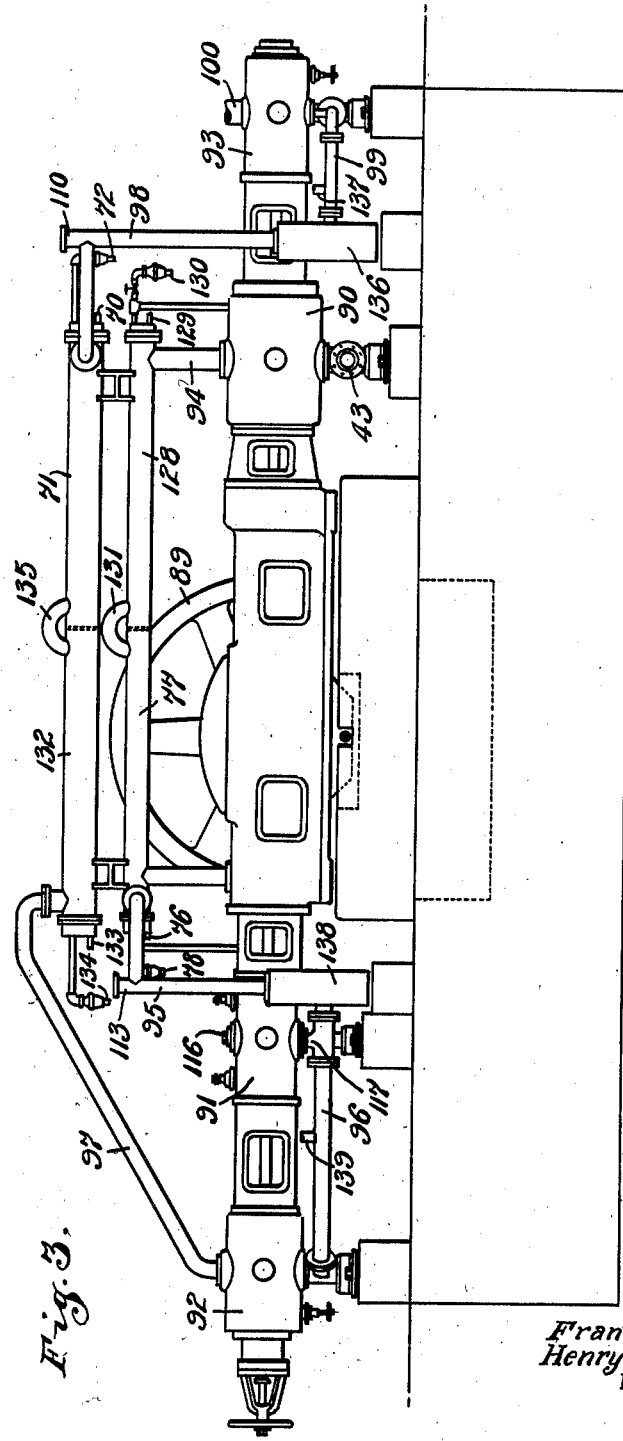
Fig. 3 is a side elevation of a compressor specially designed for use in connection with the present invention.
Figure 4:
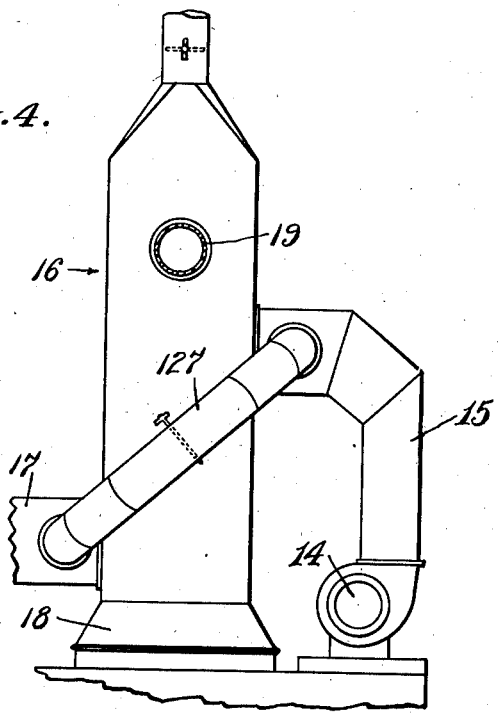
Fig. 4 is a side elevation of a pre-heater used in association with the furnace of Fig. 2.

The flywheel 83 of the engine 82 is connected to drive the flywheel 89 of a four-cylinder, three-stage compressor. This compressor is illustrated diagrammatically in Fig. 1, and in elevation in Fig. 3. The compressor includes cylinders 90, 91, 92, and 93 having therein pistons which are connected in tandem to the flywheel 89.

Pure carbon dioxide which has been separated from condensed water in the trap or separator 42 flows through the pipe 43 to the first stage cylinder 90 of the compressor. In that cylinder, the gas is compressed to a gauge pressure of 60 pounds per square inch, and it flows thence through the pipe 94 to and through a heat interchanger 128 which is cooled by water at available temperature circulating through the pipes 129 and 130. From the interchanger 128, the compressed gas flows through the pipe 131 to the interchanger 77 which, as has been explained, is cooled by refrigerated water from the tank 60. From the interchanger 77, the gas flows through the pipe 95 to and through a water separator 138, and thence through a pipe 96 to the second stage cylinder 92 of the compressor. In the cylinder 92, the pressure of the gas is raised to approximately 300 pounds per square inch gauge.

From the cylinder 92, the gas flows through the pipe 97 to a heat interchanger 132 which is cooled by water at available temperatures circulating through the pipes 133 and 134. From the interchanger 132, the gas flows through the pipe 135 to the interchanger 71 which is cooled, as has been explained, by refrigerated water from the tank 60. From the interchanger 71, the gas flows through the pipe 98 to and through a water separator 136 and thence, through the pipe 99, to the third stage cylinder 93 of the compressor.

In the third stage cylinder 93, the gas is compressed to the condensing pressure; and the highly compressed gas flows from the cylinder 93 through the pipe 100 to and through a first heat interchanger 101 which is cooled by water at available temperature flowing through the pipes 102 and 103. From the interchanger 101, the gas flows through pipe 104 to and through a second heat exchanger 105 which is cooled by refrigerated water from the tank 60, flowing through the circuit 69, 106, 105, 107, 73, 74.

If liquid carbon dioxide is to be the end product of the process, the liquid formed in the interchanger 105 is led directly to the filling stand (not shown), where it is charged into suitable containers. If, however, the process is to be continued to manufacture solid carbon dioxide as the end product, the liquid carbon dioxide is caused to flow from the interchanger 105 through the pipe 108 to a first evaporation chamber 109.

In the chamber 109, the liquid is permitted to evaporate to a pressure substantially equal to the discharge pressure of the cylinder 92, the gas evaporated in the chamber 109 being led through a pipe 110 to mix in the pipe 98 with the cooled gas flowing from the exchanger 71 and through the water separator 136. A portion of the gas flowing through the pipe 110 is by-passed around the separator 136 through a conduit 137 to the conduit 99, and so to the cylinder 93 where the returning gas is again brought to the condensation pressure. The evaporation in the chamber 109, of course reduces the temperature of the liquid in the chamber 109. The cold liquid flows through a pipe 111 to a second evaporating chamber 112.

In the chamber 112, the liquid is permitted to evaporate down to a pressure of approximately 100 pounds per square inch gauge. The gas evaporated in the chamber 112 is led through a pipe 113 to mix with the cold gas flowing from the interchanger 77 in the pipe 95; and the major portion of the gas flowing through the pipe 113 is caused to pass through the water separator 138 and thence to the pipe 96. A small portion of the gas flowing through the pipe 113 is by-passed around the separator 138 through the conduit 139, and so to the pipe 96. The gas flowing through the pipe 113 is thence introduced into the cylinder 92 at a pressure of 60 pounds gauge to be recompressed to approximately 300 pounds per square inch gauge.

The purpose of introducing cold gas from the pipes 110 and 113 to mix with the gas in the pipes 95 and 98 is to reduce the temperature of the gas flowing through the pipes 95 and 98 to a point sufficient to effect a suitable separation of water vapor which is present in the gas flowing through the pipes 95 and 98. The by-passes 137 and 139 are so designed and manipulated as to permit just enough cold gas to mix with the warmer gas in advance of the separators 136 and 138 to effect such separation.

The evaporation of liquid in the chamber 112 reduces the temperature of the remaining liquid to approximately minus 50 degrees.

Liquid is permitted to flow from the chamber 112 through the pipe 114 into the ice press 115. The pressure in the chamber 115 is permitted to build up rapidly to approximately 60 pounds per square inch gauge, and thereafter the line 116 is opened to permit gas to flow from chamber 115 through cylinder 91 to cylinder 92, whereby such gas is recompressed in cylinder 92 and returned to the system. When sufficient liquid has entered the chamber 115 to make a block of solid carbon dioxide of the desired size, communication between the chambers 112 and 115 is closed, but evaporation in chamber 115 continues, without reduction of pressure in such chamber until the direct freezing of the liquid in chamber 115 is substantially completed; the gas resulting from such evaporation being drawn by the cylinder 92 through the line 116 and cylinder 91, recompressed in cylinder 92, and so reintroduced into the system. As a result of this operation, the rate of evaporation in the chamber 115 is relatively slow, and the reduction of temperature due to the evaporation results in direct freezing of the carbon dioxide from the liquid phase to the solid phase, as distinguished from precipitation of solid carbon dioxide in the usual snow-tank. As a result the solid which is produced is in the form of a relatively compact cake, capable of holding its shape and to a certain extent, of resisting crushing forces; as distinguished from snow.

After the liquid in the chamber 115 has all been frozen, the pressure is rapidly pumped down to atmospheric pressure and the solid in the chamber is subjected to a mechanical pressure sufficient to reduce its size and increase its density to desired commercial values; an ice press of any well-known type being used for applying such pressure.

The gas which leaves the chamber 115 at 60 pounds gauge pressure during the freezing process is drawn through pipe 116 and cylinder 91, and thence through pipes 117, 95 and 96 to the cylinder 92. During that period, the suction valves of the cylinder 91 are held open or unloaded, so that no work is done in the cylinder 91. When, after the freezing in chamber 115 is practically completed, the pressure in said chamber begins to drop and reaches a value between 40 and 50 pounds gauge, the suction valve at one end of cylinder 91 is released, and that end of said cylinder begins to work; supplying gas to the cylinder 92 at a pressure of 60 pounds gauge. Operation of cylinders 91 and 92 rapidly reduces the pressure in chamber 115 thereafter and when such pressure drops to a value of about 20 pounds gauge, the other suction valve of cylinder 91 is released and the cylinder 91 comes into full operation. Such operation is continued until the pressure in chamber 115 drops to substantially atmospheric value, whereupon, both suction valves of cylinder 91 are again unloaded to prevent cylinder 91 from pumping the pressure in chamber 115 to a value below atmosphere.

Figure 5:
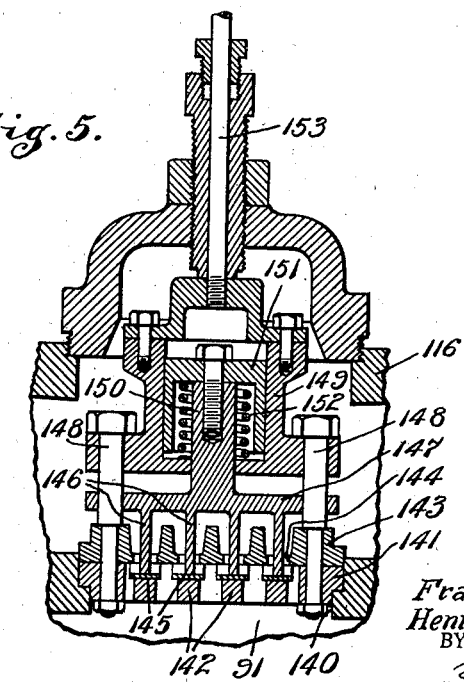
Fig. 5 is a section through an unloader valve used in connection with the compressor of Fig. 3.

In Fig. 5, we have illustrated in detail one of the inlet valves for the cylinder 91.

The wall of said cylinder is formed with a port 140 in which is mounted a grating 141 provided with spaced bars 142 which are concave on their upper surfaces. A second grating 143 is supported upon the grating 141 and is provided with apertures 144 staggered with respect to the apertures between the spaced bars. Spring leaves 145 normally close the apertures 144, but may be moved to the positions illustrated in Fig. 5 by the fingers 146 of a fork 147 slidable on bolts 148 connecting the gratings 141 and 143 with a housing 149.

The gratings 141 and 143 are interposed between the interior of the cylinder 91 and the interior of the conduit 116.

The fork 147 is provided with a stem 150 which extends into the interior of the housing 149 and is provided therein with a head 151. A spring 152 urges said head 151 to its uppermost position. A conduit 153 leads from a source of fluid under pressure to the interior of the housing 149. Obviously, the fork 147 is normally in its uppermost position, being urged thereto by the spring 152. When pressure is admitted to the housing 149 through the conduit 153, the head 151 is depressed, carrying with it the fork 147, whereby the fingers 146 are projected through the apertures 144 to depress the leaves 145 to the positions illustrated in Fig. 5, whereby communication is established between the conduit 116 and the cylinder 91. Obviously any other type of unloading valve might be used in place of that herein illustrated.

It will be obvious that the ideal plant for the production of solid carbon dioxide is one which (a) may be located near the market for solid carbon dioxide; (b) may be of the desired size without considerations for other products; (c) may be operated when the major product is desired; (d) can use a cheap fuel such as coal; (e) can operate without purchased power; and (f) is substantially independent of the temperature of cooling water available at the desired site. Obviously, a plant built primarily for the production of solid or liquid carbon dioxide can readily be designed and located to comply with the first three of the above desiderata.

In our experience, however, no commercial plant prior to our present invention has ever possessed the last three of the above-listed desired characteristics.

All commercial installations known to us use coke as a fuel. The substitution of coal for coke requires that the volatiles which are present in coal must be burned completely. If combustion is complete, the products of the volatiles are carbon dioxide, water, and sulphur dioxides; whereas if combustion is incomplete they will be carbon dioxide, carbon monoxide, water, sulphur dioxide, hydrogen sulphide, and some complex hydro-carbons. In addition, of course, there is nitrogen which is introduced with the oxygen in the air.

The scrubbers normally used in this general type of carbon dioxide plant will remove sulphur dioxide from the gases, but they will not remove hydrogen sulphide or the unburned hydrocarbons. Either of these substances present in the supposedly pure carbon dioxide gas would seriously affect the efficiency of the liquefaction or solidification process.

One method of helping to complete combustion would be to use a large amount of excess air, but this has the big disadvantage of diluting the final percentage of carbon dioxide present in the flue gas. Such a dilution would tremendously reduce the efficiency of the adsorption step, and would further result in the needless utilization of large amounts of power to handle the increased volume of flue gas.

Using only a small amount of excess air, combustion can be completed if the rate of reaction is high and if time enough is allowed before chilling the flue gas. Of course, further combustion cannot be expected after the flue gases come into contact with the first of the boiler tubes.

Figure 2:
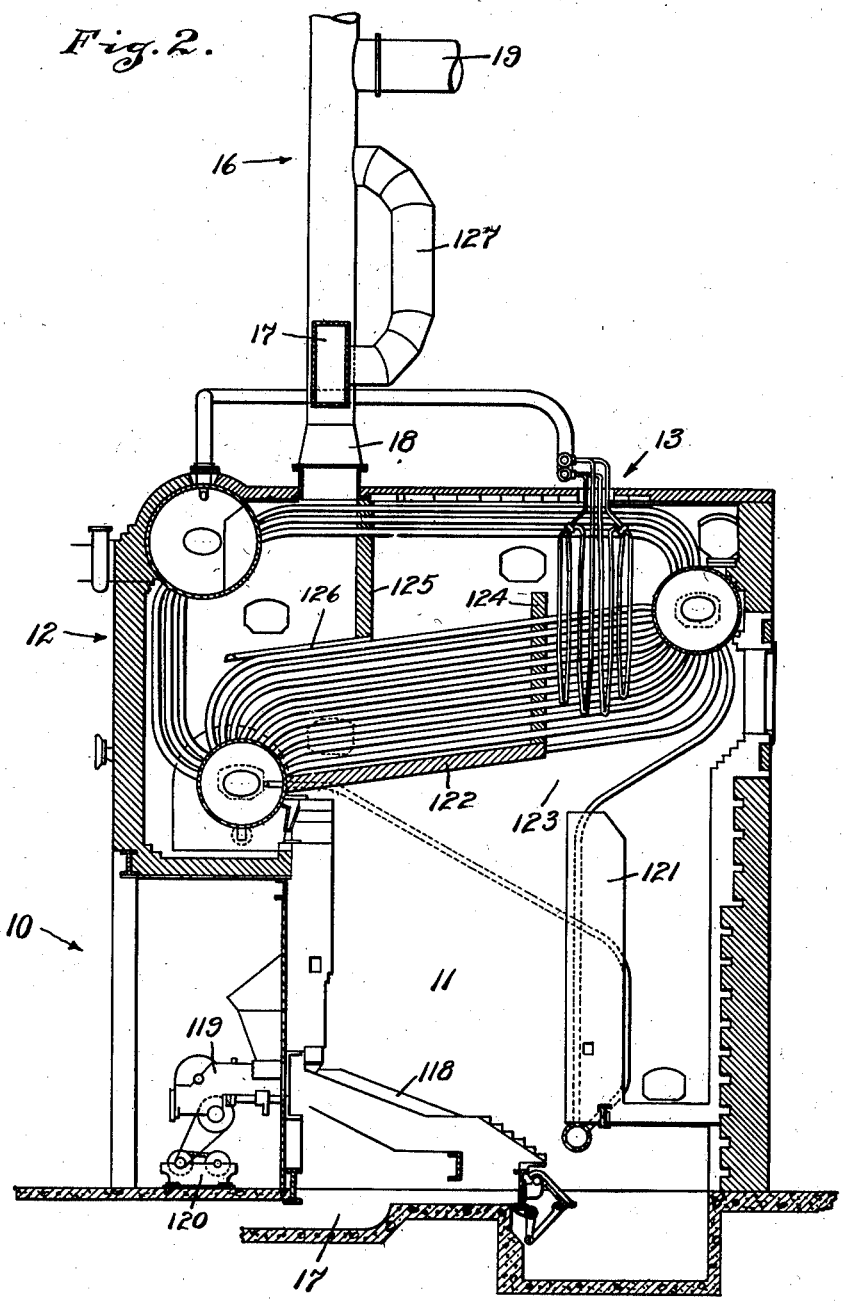
Fig. 2 is a more or less diagrammatic lateral section of a furnace and boiler installation forming a part of the present invention.

In accordance with our invention, the boiler installation illustrated in Fig. 2 is designed to aid in approaching very close to absolutely complete combustion of coal. An under feed stoker 118 of well known type is fed by stoker mechanism 119 driven by a variable speed transmission 120 preferably automatically controlled. The air for supporting combustion is pre-heated as it flows through the pre-heater 16, thereby accomplishing the double objective of reducing the temperature of the flue gases before they are introduced into the scrubbers, and increasing the temperature of the air supplied to the furnace grate. Obviously, this increase in temperature of the air supplied to the furnace will result in an increase in the temperature within the combustion chamber 11, whereby the ease of reaction is raised to assist in effecting complete combustion.

In order to extend the time before the gases within the chamber 11 come into contact with the relatively cold boiler tubes, we build the bridge wall 121 considerably higher than usual; and we cover the bottom row of boiler tubes with a refractory wall 122 extending from the front of the boiler substantially to, or even beyond, the bridge wall 121. We thus eliminate any bare tubes "looking" at the fire. We use a high bridge wall and thick, uncooled side walls. We use a high boiler setting, giving us a large combustion space and a low heat release.

This construction results in the attainment of 2800 to 3000 degrees F. within the combustion chamber, and the maintenance of a high rate of reaction. The high bridge wall assists in maintaining this condition, and in addition reduces the area of the passage 123, whereby a turbulence in the flue gas before it contacts the boiler tubes is created. Such turbulence is also conducive to complete combustion.

The use of a stoker with a small amount of forced draft results in the introduction of green coal in uniform small quantities, so that the amount of volatile matter is introduced to the combustion chamber uniformly. We consider that an under-feed stoker is desirable, since that type of stoker brings the fines in the coal up through the fuel bed, whereby they are distilled off and burned before they can be carried out of the furnace by the flue gases unburned or partially burned.

Baffles 124, 125, and 126 are suitably introduced into the boiler setup to provide for proper flow of the gases through the boiler tubes. A by-pass 127 around the preheater is provided so that, if desired, air can be introduced to the furnace at lower temperatures.

With the illustrated construction, and with careful control of the primary and secondary air, it is possible to operate with a small amount of excess air to obtain a flue gas mixture having a carbon dioxide content of at least 16 per cent. With proper provision for ash removal it is possible to maintain this condition without interruption for cleaning fires.

Of course, the use of coal results in a larger production of steam per pound of fuel, because of the higher heat content of coal.

The steam in the boiler 12 is generated at fairly high pressure (for instance 225 pounds per square inch) and is superheated, for instance, 150 degrees F. With this superheat and pressure and the proper cylinder volume in the main engine 82 to permit an early cutoff, it is possible to obtain a water rate of approximately 20 pounds of steam per horsepower, even though the back pressure at the engine 82 is maintained at 15 pounds per square inch. As explained hereinbefore, the exhaust steam from the engine 82 is used in the lye boiler 34 and the condensate is returned to the boiler. The plant is so designed that the amount of exhaust steam coming from the engine 82 is just about the amount needed by the lye boiler. Any deficiency is, of course, made up with high pressure steam from the main boiler. The pressure and superheat at which the steam is generated is so selected that the amount of steam needed by the lye boiler will, in passing through the engine, develop enough power to handle the mechanical load of the plant including pumps, blowers, compressors, and other items of mechanical loading.

The largest item in the mechanical load of the plant is the four cylinder compressor. The horsepower required for compressing the carbon dioxide (both that newly produced and that which has been previously compressed and then expanded for refrigeration) varies with the temperature of the cooling water available. If the natural temperature of the available cooling water were 60 degrees F. or less, about 25 per cent of the steam generated in the boiler 12 would be available for either excess power or additional blower horsepower to compress the flue gas to a higher pressure before introducing the same into the bubble column 26. In most locations, however, naturally available cooling water will be at a temperature of 80 degrees or more during the summer. It is for that reason that we have provided the refrigerating system hereinabove described. If, during the winter months, the refrigerating system is not needed because of the low temperature of available natural cooling water, the gas may be by-passed around the interchanger 40 through the pipe 39'; and all of the other heat exchangers, illustrated as being cooled by water from the tank 60, may be cooled by naturally available water.

It should be noted that the use of water in the scrubbers 20 and 22 which has been warmed by passage through the condenser 64, the exchanger 40, and the exchanger 48, is advantageous; since the higher the temperature of water used in the scrubbers 20 and 22, the less carbon dioxide will be dissolved therein in the scrubbers.

The increased efficiency of the plant illustrated herein, as compared with previously known plants for the production of liquid and solid carbon dioxide, is due to the following features of the herein-disclosed plant:

(a) The use of coal instead of coke as the source of carbon dioxide, whereby the cost of fuel per pound of carbon dioxide is reduced.

(b) The use of specially designed furnace and boiler equipment whereby complete combustion of the fuel used is attained.

(c) The production of more steam per dollar of fuel cost, as the result of using coal instead of coke and obtaining complete combustion thereof.

(d) The use of a bubble column in place of the usual coke-filled absorption tower, whereby a more perfect separation of carbon dioxide is attained.

(e) The design of the main engine for driving the mechanical units of the plant, in such fashion as to exhaust almost exactly the amount of steam required in the lye boiler, when operating to drive the various items of mechanical equipment.

(f) The use of steam generated in the boiler in excess of the requirements of the engine and the lye boiler, to provide refrigerated water for cooling the material handled in various steps of the process.

(g) The use of large volumes of relatively warm water to effect preliminary cooling of the material handled before final cooling thereof to abnormally low temperatures by refrigerated water.

(h) The use of a single machine to effect all necessary compression in three stages, whereby the friction losses are cut down.

(i) The use of the particular apparatus and process herein-described, for refrigerating and solidifying the purified carbon dioxide, including the return of portions of evaporated carbon dioxide to the compressing system at relatively high pressures.

(j) The freezing of solid carbon dioxide directly from a relatively large body of liquid instead of from the highly divided stream issuing from a jet, whereby the product is more dense and consequently more stable.

(k) The step of producing solid carbon dioxide by controlling the evaporation of liquid carbon dioxide in such a manner as to hold the pressure in the evaporation chamber substantially at or above 60 pounds per square inch throughout the period of phase change from liquid to solid.

We claim as our invention:

1. A method of solidifying gaseous carbon dioxide which includes the steps of passing the gaseous carbon dioxide through a plurality of cumulative compression steps, cooling the compressed carbon dioxide after each compression step, at least one of the cooling steps including heat interchange with a relatively large volume of circulating liquid at substantially atmospheric temperatures followed by heat interchange with an artificially cooled liquid circulating medium, the final cooling step effecting liquefaction of the carbon dioxide, further cooling the liquefied carbon dioxide by a plurality of cumulative partial evaporation steps conducted in separate chambers, leading the evolved gaseous carbon dioxide from each partial evaporation step into one or another of the compression steps for subsequent recompression, and finally freezing the remaining liquid carbon dioxide by controlled partial evaporation at substantially the critical pressure.

2. A method of solidifying gaseous carbon dioxide which includes the steps of passing the gaseous carbon dioxide through a plurality of cumulative compression steps, cooling the compressed carbon dioxide after each compression step, at least one of the cooling steps including heat interchange with a relatively large volume of circulating liquid at substantially atmospheric temperatures followed by heat interchange with an artificially cooled liquid circulating medium, the final cooling step effecting liquefaction of the carbon dioxide, further cooling the liquefied carbon dioxide by a plurality of cumulative partial evaporation steps conducted in separate chambers, leading the evolved gaseous carbon dioxide from each partial evaporation step through a heat interchange with oncoming fresh gaseous carbon dioxide into one or another of the compression steps for subsequent recompression, and finally freezing the remaining liquid carbon dioxide by controlled partial evaporation at substantially the critical pressure.

3. A method of converting carbon dioxide from its gaseous phase, which includes the steps of refrigerating a body of water by evaporating a portion of such body by projecting a jet of high pressure steam across the surface thereof, bringing a large volume of water at natural temperatures into condensing relation with the mixture of steam and vapor produced by such evaporation, thereafter cooling a stream of gaseous carbon dioxide by heat exchange with such condensing water, thereafter further cooling such stream of carbon dioxide by heat exchange with a portion of the refrigerated water, compressing the cooled gaseous carbon dioxide to produce therein a pressure in excess of 60 pounds per square inch gage, thereafter absorbing the heat of compression and the latent heat of the gaseous carbon dioxide by bringing a second portion of such refrigerated water into heat exchange relation with the gas, thereby producing a phase change in the gas.

4. A method of producing solid carbon dioxide which comprises the steps of refrigerating a body of water by evaporating a portion of such body by projecting a jet of high pressure steam across the surface thereof, bringing a large volume of water at natural temperatures into condensing relation with the mixture of steam and vapor produced by such evaporation, thereafter cooling a stream of gaseous carbon dioxide by heat exchange with such condensing water, thereafter further cooling such stream of carbon dioxide by heat exchange with a portion of the refrigerated water, compressing the cooled gaseous carbon dioxide to produce therein a pressure in excess of 60 pounds per square inch gage, thereafter absorbing the heat of compression and the latent heat of the gaseous carbon dioxide by bringing a second portion of such refrigerated water into heat exchange relation with the gas, thereby producing a phase change in the gas, thereafter further cooling the liquid carbon dioxide by partial evaporation thereof, maintaining the pressure upon the liquid carbon dioxide at least slightly in excess of 60 pounds per square inch gage, whereby the carbon dioxide is converted directly from the liquid phase to the solid phase, and thereafter reducing the pressure impressed upon the frozen carbon dioxide to atmospheric value.

5. A method of converting carbon dioxide from its gaseous phase, which includes the steps of passing gaseous carbon dioxide through a series of cumulative compressions, and cooling the carbon dioxide, after each compression step, first by heat exchange at substantially natural temperatures and then by heat exchange with successive charges of an artificially cooled liquid circulating medium, the final cooling step effecting a phase change in the carbon dioxide.

6. The method of producing carbon dioxide in solid form, which includes the steps of burning fuel to produce a mixture of gaseous products of combustion including carbon dioxide, extracting heat from such mixture to raise the temperature of air being supplied to the combustion chamber, compressing such mixture and passing such mixture through a suitable liquid medium whereby a major portion of the carbon dioxide is absorbed in such medium, applying a portion of the heat generated in the combustion chamber to the generation of steam, using at least a portion of the steam so generated to drive an engine, passing such medium enriched with carbon dioxide to a chamber and there heating such medium by association with the steam exhausted from such engine, to drive carbon dioxide out of such medium, returning the medium stripped of carbon dioxide for contact with further gaseous mixture, cooling such stripped medium during such return by heat exchange with oncoming medium enriched with carbon dioxide, using a portion of the heat generated in the combustion chamber to produce a refrigerating effect upon a suitable circulating refrigerating medium, cooling the gaseous carbon dioxide so driven off by heat exchange with water supplied in large quantities from any natural source at temperatures substantially at least as high as the source temperature, subsequently further cooling such gaseous carbon dioxide by heat exchange with said refrigerating medium, using the engine to compress such cooled gaseous carbon dioxide, and using one or more further charges of such refrigerating medium further to cool such carbon dioxide, whereby the carbon dioxide is liquefied, evaporating a portion of the liquid carbon dioxide to reduce the temperature of the remaining liquid carbon dioxide, continuously supplying the cold liquid carbon dioxide to a chamber while substantially maintaining a gauge pressure of 60 pounds per square inch in said chamber by further controlled partial evaporation of carbon dioxide in said chamber, whereby the residual liquid carbon dioxide so supplied is frozen directly from the liquid phase to the solid phase in said chamber, subsequently reducing the pressure in said chamber substantially to an atmospheric value, and thereafter compressing the cake of solid carbon dioxide so formed.

7. A method of producing carbon dioxide in solid form, which includes the steps of burning fuel under high temperature conditions to effect substantially complete oxidation of all free and combined carbon, whereby a mixture of gaseous products of combustion including carbon dioxide is produced, compressing such mixture and introducing such compressed mixture to intimate contact with a suitable liquid medium whereby a major portion of the contained carbon dioxide is absorbed in such medium, passing such medium enriched with carbon dioxide to another chamber and therein heating such enriched medium to drive off carbon dioxide, utilizing portions of the heat generated upon combustion of such fuel to perform upon the gaseous carbon dioxide a succession of compressing operations and cooling operations, at least one cooling operation, effected by the utilization of such heat, following each of such compressing operations, whereby said carbon dioxide is liquefied, evaporating a portion of said liquid carbon dioxide whereby the remaining liquid carbon dioxide is further cooled, and supplying such cold liquid under pressure to a freezing chamber and there causing further evaporation while maintaining a pressure in said chamber of approximately 60 pounds per square inch, gauge, whereby the remaining liquid in said chamber is frozen directly from the liquid phase to the solid phase, thereafter reducing the pressure in said chamber to substantially atmospheric value whereby the temperature of the solid carbon dioxide is reduced, and thereafter compressing the cake of solid carbon dioxide in said chamber.

8. Apparatus for producing solid carbon dioxide, including a furnace, a boiler associated with said furnace and adapted to be heated by the combustion of fuel therein to produce steam, a flue connected with said furnace for conducting certain of the products resulting from the combustion of fuel in said furnace, means for separating carbon dioxide from the other components of such products conducted by said flue, said flue discharging into said separating means, a steam engine, means connecting said boiler to supply steam to said engine to operate the same, a refrigerating system, means for supplying a liquid circulating medium to said refrigerating system, means connecting said boiler to supply steam to said refrigerating system to operate the same to chill such liquid circulating medium, a multi-stage compressor driven by said engine, connections for leading carbon dioxide from said separating means to the initial stage of said compressor wherein said carbon dioxide is compressed, a plurality of heat exchangers, means for leading the compressed carbon dioxide successively through all of the stages of said compressor, whereby said carbon dioxide is progressively compressed at least to its critical value, the compressed carbon dioxide being led, after each compression stage, through one of said heat exchangers, means connecting said refrigerating system with all of said heat exchangers to circulate chilled circulating medium to each of said exchangers to extract heat from the compressed carbon dioxide, whereby the carbon dioxide is liquefied after the final compression stage, other means for further cooling the liquid carbon dioxide, a freezing chamber, means for supplying cold liquid carbon dioxide to said freezing chamber, and means for controlling the rate of evaporation of carbon dioxide in said chamber and for maintaining the pressure in said chamber substantially at the critical point, whereby the liquid carbon dioxide is directly converted to the solid phase.

FRANKLIN B. HUNT.
JABEZ H. PRATT.
HENRY S. TIRRELL.
ROBERT L. TURNER.